US012304782B1

(12) United States Patent
Gremillion et al.

(10) Patent No.: US 12,304,782 B1
(45) Date of Patent: May 20, 2025

(54) CONVERTIBLE FAIRLEAD ASSEMBLY

(71) Applicants: Max K. Gremillion, Williams, AZ (US); Colleen P. Gremillion, Williams, AZ (US)

(72) Inventors: Max K. Gremillion, Williams, AZ (US); Colleen P. Gremillion, Williams, AZ (US)

( * ) Notice: Subject to any disclaimer, the term of this patent is extended or adjusted under 35 U.S.C. 154(b) by 269 days.

(21) Appl. No.: 17/977,333

(22) Filed: Oct. 31, 2022

Related U.S. Application Data

(60) Provisional application No. 63/274,173, filed on Nov. 1, 2021.

(51) Int. Cl.
*B66D 1/36* (2006.01)

(52) U.S. Cl.
CPC ........ *B66D 1/36* (2013.01); *B66D 2700/0191* (2013.01)

(58) Field of Classification Search
CPC .......................... B66D 1/36; B66D 2700/0191
See application file for complete search history.

(56) References Cited

U.S. PATENT DOCUMENTS 3,070,355 A 12/1962 Wyatt
3,708,152 A 1/1973 Bulin
3,987,526 A 10/1976 Poplawski
6,729,606 B1 5/2004 Durin
D731,293 S 6/2015 Fretz
D807,732 S 1/2018 Fretz
10,273,127 B2 4/2019 Fretz
10,407,286 B1 * 9/2019 Bellis, Jr. ................. B66D 1/36
10,450,172 B1 * 10/2019 Shaul ....................... B66D 1/36
D908,473 S 1/2021 Montes et al.
2009/0146119 A1 6/2009 Bailey et al.
2014/0001428 A1 * 1/2014 Fretz ........................ B66D 1/36 254/395
2017/0320710 A1 * 11/2017 Fretz ........................ B66D 1/36

FOREIGN PATENT DOCUMENTS

KR 20040035173 A 4/2004

* cited by examiner

*Primary Examiner* — Sang K Kim
*Assistant Examiner* — Nathaniel L Adams
(74) *Attorney, Agent, or Firm* — Invention To Patent Services; Alex Hobson

(57) ABSTRACT

The invention is directed to a convertible fairlead assembly system that may be configured as a roller fairlead that has rolling surfaces substantially along the perimeter of the fairlead cable opening, a hawse-roller fairlead, having hawse fixtures on either end a first and second roller, and a combination fairlead having a hawse fixture on one end and an end-roller fixture on the opposing end. A bracket may be configured with attachment apertures to allow fasteners to secure the end fixture to either end and in any combination. The first and second rollers may be configured in a roller extension groove along the roller extensions of the bracket to produce a compact design.

17 Claims, 14 Drawing Sheets

CONVERTIBLE FAIRLEAD ASSEMBLY

CROSS REFERENCE TO RELATED APPLICATIONS

This application claims the benefit of priority to U.S. provisional patent application No. 63/274,173, filed on Nov. 1, 2022; the entirety of which is hereby incorporated by reference.

BACKGROUND OF THE INVENTION

Field of the Invention

The invention relates to a convertible fairlead assembly that enables a fairlead to be converted from a roller fairlead to a hawse fairlead or a combination fairlead having one end-roller assembly and one hawse fixture, on opposing ends of the fairlead.

Background

Fairleads are used to guide ropes or cords as they are pulled through an opening in the fairlead. The perimeter surfaces of this opening may be rollers to reduce friction and wear of the rope, or they be smooth rounded surfaces for this purpose. Fairleads have to be durable as tension from the rope creates a considerable force. It may be desirable in some cases to use a roller fairlead and in other cases a hawse fairlead, depending on the type of rope and the application. There is a shift to synthetic ropes, especially on vehicle winches, and these ropes are susceptible to fraying, especially when subjected to heat, which may be from the fairlead. Aircraft cable is also being used which is typically a stainless blend of fine filaments and these too are susceptible to fraying especially when sliding over a rough step or corner.

SUMMARY OF THE INVENTION

The invention is directed to a convertible fairlead assembly system that has a convertible fairlead assembly to allow the fairlead to be configured as a roller fairlead, a hawse fairlead or a combination fairlead. The fixtures of the end-roller assembly and hawse fixture may have apertures that align with the bracket of the fairlead to enable interchanging these components and also exchanging the components from one side to another. This adjustability by allow a user to configured the fairlead for a particular purpose. Also, the fixtures may be interchanged to reduce wear in a particular location from ropes being pulled through and over a consistent area of the fairlead. A hawse fairlead may be referred to herein as a hawse-roller fairlead as the fairlead has extension rollers extending between the two hawse fixtures.

The convertible fairlead assembly may be configured as a roller fairlead that has rolling surfaces substantially along the perimeter of the fairlead cable opening. A roller fairlead has a first end-roller assembly on the first end and a second end-roller assembly configured on the opposing second end, and with a first roller extending along the top, or first side, of the fairlead and a second roller extending along the bottom, or second side, and between the two end-roller assemblies. The end-roller assembly have an end-roller that is concave in shape to provide a smooth radiused surface from the first and second rollers.

The convertible fairlead assembly may be configured as a hawse fairlead with a first hawse fixture assembly on the first end and a second hawse fixture configured on the opposing second end, and with a first roller and second roller extending between the two hawse fixtures.

The convertible fairlead assembly may be configured as a combination fairlead with a hawse fixture assembly on a first end and an end-roller assembly configured on the opposing second end, and with a first roller and second roller extending between the hawse fixture and the end-roller assembly.

The end-roller assemblies and the hawse fixtures may be interchangeable from end to end of a bracket and therefore may be interchanged to form a desired type of fairlead. A bracket, may be a monolithic component that is configured to retain the end-roller assembly and the hawse fixture. A bracket has a first end bracket, a second end bracket, and a first roller extension and a second roller extension extending therebetween to form the fairlead cable opening. The first roller extension and a second roller extension may have a concave recess for receiving the rollers, also referred to as extension rollers that extend from first end bracket to the second end bracket. The end-roller assemblies may be coupled to the bracket by fasteners that extend through the bracket and into the end-roller fixture, such as through the back of the bracket. Likewise, the hawse fixtures may be coupled to the bracket by fasteners that extend through the bracket and into the hawse fixture, such as through the back of the bracket. The attachment apertures maybe aligned and symmetric between the end-roller fixture and the hawse fixture to enable them to be interchanged. Also, the attachment apertures in the first end bracket and second end bracket may be symmetrical to allow an end-roller assembly and/or a hawse fixture to be configured on either end of the bracket. This versatile configuration enables interchangeability of the components as desired. Also, a mounting aperture is configured through the bracket in both the first end bracket and second end bracket and these mounting apertures align with mounting apertures in the end-roller fixture and the hawse fixture.

When configured as the roller fairlead, the perimeter of the fairlead cable opening may be substantially rollers, or at least 90% or more of the perimeter and preferably 95% or more of the perimeter. A small area between the first and second roller and the end-rollers may be the only area or segment of the perimeter that is not a roller surface. Also, the axes of rotation of the first and second roller and the end-rollers maybe substantially within the same plane to provide smooth transition between the first and second rollers and the end-roller. The end-roller configured in the end-roller assembly may be concave and have a radius of curvature that is about the same as the diameter of the first or second rollers, or within about 20% or less, or about 10% or less. The transition from the end-roller surface to the outside first or second roller surface may be about 5 mm or less, or about 3 mm or less, or about 1 mm or less and any range between and including the transition offset distances provided. The outside ends of the end-roller may be substantially tangent with the outside surfaces of the first and second rollers, or within about 20 degrees or less, within about 15 degrees or less, within about 10 degrees or less within about 5 degrees or less, or within about 2 degrees or less from tangent. The more tangent the end of the end-roller is with the outside surface of the extension roller, the smoother the transition when a rope or cable slides from the first or second extension roller into the end-roller concave surface.

When configured as a hawse-roller fairlead, the hawse fixtures are coupled to the first end bracket and second end bracket of the bracket. The hawse fixture has a smooth curved rope surface that is concave from the first and second extension rollers, to provide a smooth transition of the rope from the first and second rollers into the smooth curved rope surface. The smooth curved rope surface may extend out to have edges that are substantially tangent with the outside surface of the first and second extension rollers, or within about 20 degrees or less, about 15 degrees or less about 10 degrees or less, within about 5 degrees or less, or within about 2 degrees or less from tangent. The more tangent the curved rope surface is with the outside surface of the first and second roller, the smoother the transition when a rope or cable slides from the roller into the curved rope surface of the hawse fixture. Put another way, the transition from the smooth curved rope surface to the outside first or second roller surface may be about 5 mm or less, or about 3 mm or less, or about 1 mm or less and any range between and including the transition offset distances provided.

The first and second rollers may be configured around a roller axle that is configured for insertion into the end fixtures, such as into roller axle apertures of the end-roller fixture or the roller axle apertures of a hawse fixture. A pin may be configured for insertion through the fixture to interface with the roller axle to prevent the axle from rotating, and/or moving along the length of the roller. The pin may intersect a cut away portion of the roller axle or may be inserted into a pin aperture in the axle.

The bracket may be configured for compact assembly of a fairlead, and both the first and second extensions may have a roller extension groove to enable the first and second rollers to seat down into this groove for compact assembly. The groove of the first roller extension and the second roller extension has a radius of curvature that is at least the respective radius of the first roller and the second roller, to allow the rollers to seat down into the groove without contacting the groove during use. The depth of the roller extension groove may be some percentage of the diameter of the first and second rollers, such as about 3% or more, about 5% or more, about 10% or more, about 20% or more, about 20% or more and any range between and including the values provided. The depth of the roller extension groove may be about 3 mm or more, about 5 mm or more, about 7 mm or more, about 10 mm or more, about 15 mm or more, about 25 mm or more and any range between and including the depth values provided. A greater depth will produce lower profile fairlead. The depth may depend on the overall size of the fairlead and the rollers. The overall thickness of the fairlead is reduced by having this nested assembly of the first and second rollers in the bracket.

An exemplary fairlead produces a substantially continuous perimeter of the fairlead cable opening having a gap distance in this perimeter between roller surfaces and the curved surface of the hawse fixture or end-roller of the end-roller assembly of no more than 5 mm and preferably not more than 3 mm. This substantially continuous perimeter reduces wear on cables and ropes and reduces the chances for snagging when the cable transitions from a roller surface to a hawse fixture surface or an end-roller surface.

Components of the convertible roller-hawse fairlead assembly may be a monolithic component that is made from a single piece of material, such as by being formed from a single piece of material in a mold or by machining a single piece of material. For example, the bracket, the end-roller fixture and hawse fixture may be a monolithic component, as described herein.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

The figures represent an illustration of some of the embodiments of the present invention and are not to be construed as limiting the scope of the invention in any manner. Some of the figures may not show all of the features and components of the invention for ease of illustration, but it is to be understood that where possible, features and components from one figure may be included in the other figures. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises." "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Figure 1:
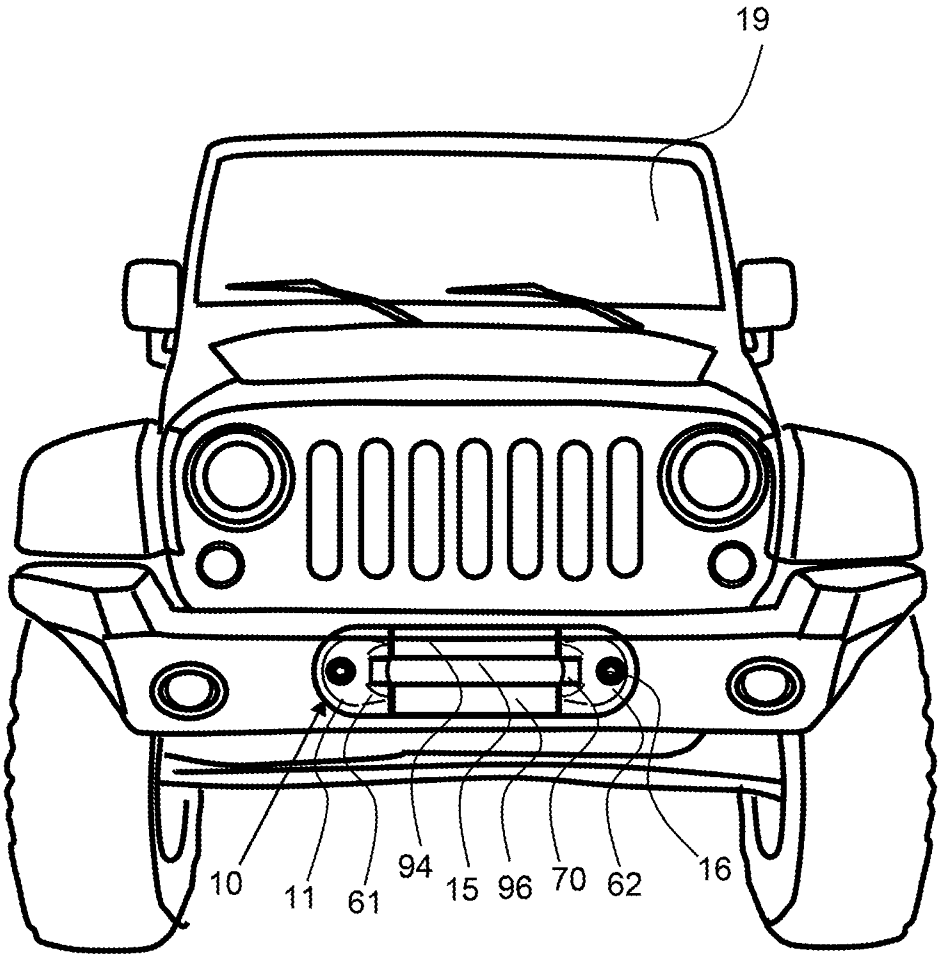
FIG. 1 shows a front view of a vehicle with a convertible roller-hawse fairlead assembly attached thereto and configured as a roller fairlead.

As shown in FIG. 1, a convertible fairlead assembly system 10 has a convertible fairlead assembly 11 mounted to the vehicle 19. The convertible fairlead assembly is configured as a roller fairlead 16 with a first-end-roller assembly 61 on the first end and a second end-roller assembly 62 configured on the opposing second end, and with a first roller 94 and second roller 96 extending between the two end-roller assemblies. The end-roller assemblies each have a concave end-roller in the end-roller assembly 70 to provide a substantially continuous rolling surface around the perimeter of the fairlead cable opening 15.

Figure 2:
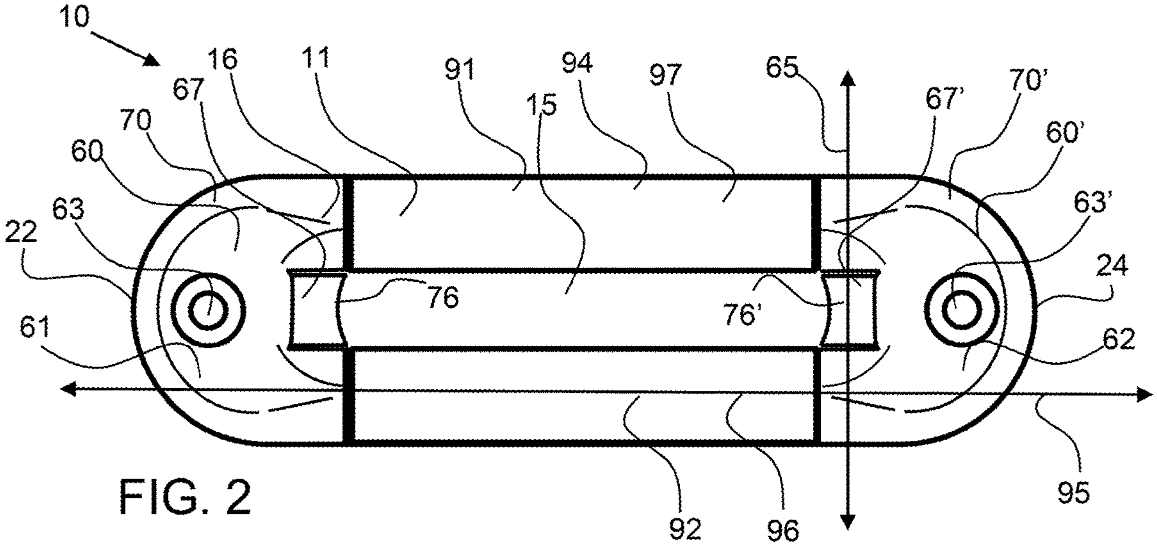
FIG. 2 shows a front view a convertible roller-hawse fairlead assembly configured as a roller fairlead with a first end-roller assembly on the first end of the roller fairlead and with a second end-roller assembly configured on the second end of the roller fairlead.

As shown in FIG. 2, the convertible roller-hawse fairlead assembly 11 is configured as a roller fairlead 16 with end-roller fixtures 60, 60' on opposing ends of the roller fairlead 16. A first end-roller assembly 61 is configured on the first end 22 of the roller fairlead and a second end-roller assembly 62 is configured on the second end 24 of the roller fairlead. A first roller assembly 91, configured with a first roller 94, and a second roller assembly 92, configured with a second roller 96, extend between the first and second end-roller assemblies to create a fairlead cable opening 15 having an inside perimeter that is substantially rollers, with a roller on the top, bottom, and both sides or ends of the fairlead cable opening and as defined herein. The first and second rollers, or extension rollers, have a respective axis of rotation 95 that extends along the length of the roller fairlead 16 from the first end 22 to the second end 24. The concave end-rollers 67, 67' have a respective axis of rotation 65 that is orthogonal (within 10 degrees of orthogonal) to the axis of rotation 95 of the first and second rollers, and may be substantially aligned along the depth or thickness of the roller fairlead so that a cable or rope moving through the fairlead cable opening 15 does not jump when moving from an extension roller to an end-roller 76. Mounting apertures 63, 63' are configured through the first end-roller assembly 61 and the second end-roller assembly 62 to enable mounting the fairlead to an object, such as a vehicle. A slot is configured in each of the end roller assemblies to accept the respective end rollers 76, 76'.

Figure 3:
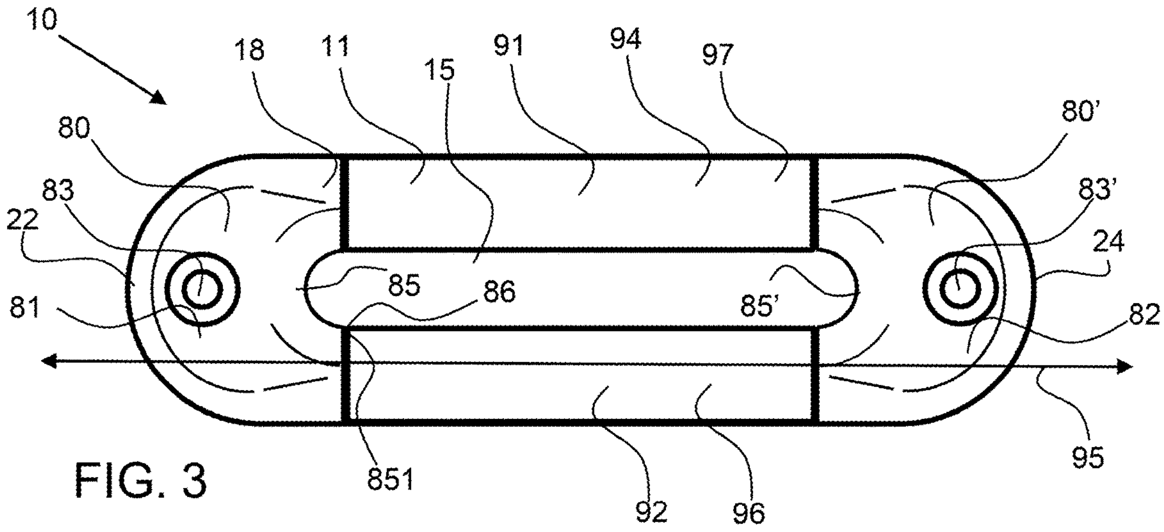
FIG. 3 shows a front view a convertible roller-hawse fairlead assembly configured as a hawse-roller fairlead with a first end hawse fixture on the first end of the hawse-roller fairlead and with a second end hawse fixture configured on the second end of the hawse-roller fairlead.

As shown in FIG. 3, a convertible roller-hawse fairlead assembly 11 is configured as a hawse-roller fairlead 18 with a first end hawse fixture 81 on the first end 22 of the hawse-roller fairlead and with a second end hawse fixture 82 configured on the second end 24 of the hawse-roller fairlead. The end hawse fixtures 80, 80' each have a curved rope surface 85, 85' having a concave shape along the perimeter of the fairlead cable opening 15. Mounting apertures 83, 83' are configured through the roller fairlead 16 to enable mounting the fairlead to an object, such as a vehicle. A first roller assembly 91, configured with a first roller 94, and a second roller assembly 92, configured with a second roller 96, extend between the first and second hawse fixtures to create a fairlead cable opening 15 having an inside perimeter. The ends 851 of the curved rope surface 85 of the hawse fixture 80 are substantially tangent, as described herein, with the outside surface of the of the first roller 94 and second roller 96. Also, the transition gap 86 between the ends of the curved rope surface 85 and the outside surface of the first and second rollers is small, such as about 10 mm or less, about 8 mm or less, about 5 mm or less and any range between and including the values provided.

Figure 4:
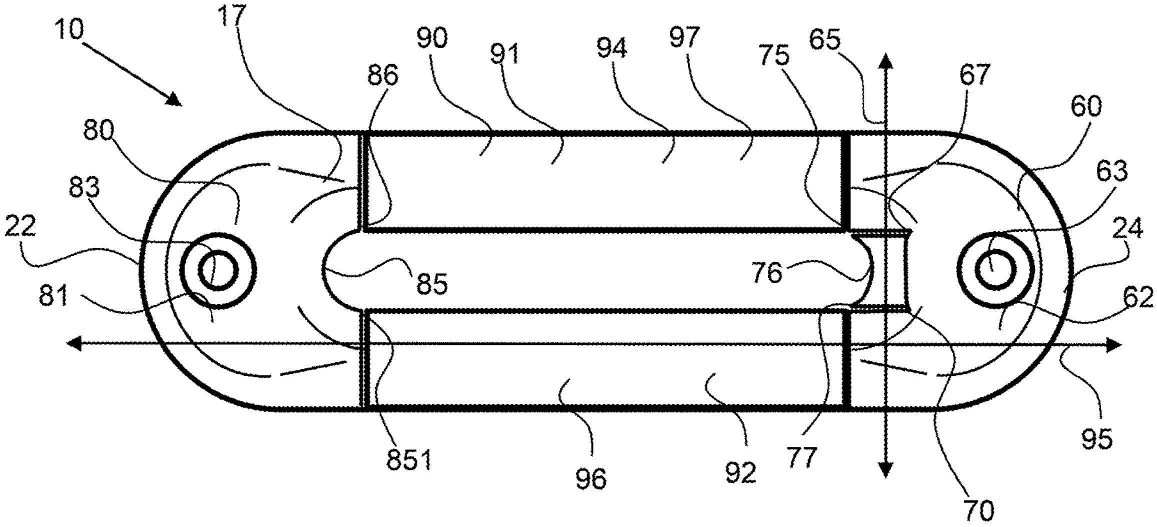
FIG. 4 shows a front view of an exemplary combination fairlead with a hawse fixture on the first end and an end-roller assembly on the second end and each detachably attached to the bracket.
Figure 5:
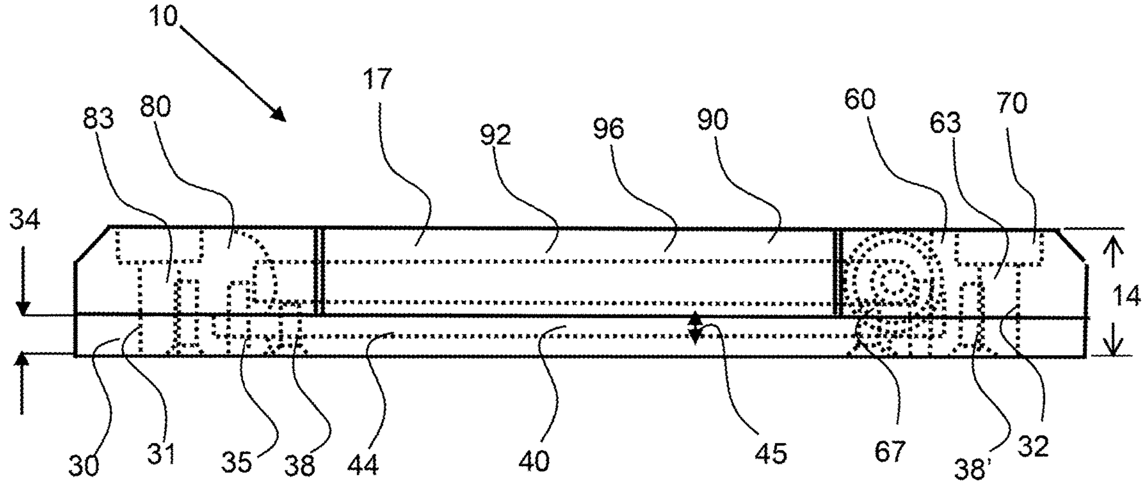
FIG. 5 shows a side view of the exemplary combination fairlead shown in FIG. 4 with a hawse fixture on the first end and an end-roller assembly on the second end.

Referring now to FIGS. 4 to 5, a combination fairlead 17 has a hawse fixture 80 configured on the first end 22 of the fairlead and an end-roller fixture 60 and end-roller assembly 60 configured on the second end 24 of the combination fairlead. This type of assembly may be used when a cable or rope is drawn through the fairlead cable opening 15 at an angle over the end-roller assembly 70 and the end-roller 76 configured therein. The end-roller assembly has an end-roller pin coupled to the end-roller assembly to configure and retain the end-roller and end roller axle 72 in the end-roller axle aperture 79 of the end-roller fixture 60. As shown in FIG. 4 the ends 77 of the end-roller 76 are substantially tangent, as described herein, with the outside surface of the of the first roller 94 and the second roller 96. Also, the transition gap 75 between the ends of the end-roller 76 and the outside surface of the first and second rollers is small, such as about 10 mm or less, about 8 mm or less, about 5 mm or less and any range between and including the values provided. A smaller transition gap 75 will result in a smoother transition of a cable or rope as it moves from the rollers into the end-roller and vice versa. Likewise, as shown in FIG. 4 the ends 851 of the curved rope surface 85 of the hawse fixture 80 are substantially tangent, as described herein, with the outside surface of the of the first roller 94 and second roller 96. Also, the transition gap 86 between the ends of the curved rope surface 85 and the outside surface of the first and second rollers is small, such as about 10 mm or less, about 8 mm or less, about 5 mm or less and any range between and including the values provided. A smaller transition gap 75 will result in a smoother transition of a cable or rope as it moves from the rollers into the end-roller and vice versa.

The combination fairlead 17 has a hawse fixture 80 configured on the first end 22 of the fairlead and an end-roller fixture 60 configured on the second end 24 of the combination fairlead; each of said assemblies being detachably attached to the bracket 30. The bracket has attachment apertures 38, 38' to allow a fastener to retain a hawse fixture or end-roller assembly thereto to the first end bracket 31 or second end bracket 32, respectively. The bracket also has a bracket pin aperture 35 configured to receive and retain a pin to retain the roller axle. The bracket has roller extensions 40 extending between the first end bracket 31 and the second end bracket 32 and these roller extensions have a roller extension groove 44 so that the first roller (not shown) and second roller 96 are recessed down into this recess to produce a lower profile fairlead. This extension groove enables a lower profile fairlead having a thickness 14 that is reduced by the extension grooves. Mounting apertures 83, 63 are configured through the hawse fixture 80 and the end-roller fixture 60, respectively, to enable mounting the fairlead to an object, such as a vehicle. The bracket 30, including the first end bracket 31, second end bracket 32 and roller extensions 40 may be a monolithic component made from a single piece of material, such as by being cast or machined from a single piece of metal. The bracket may have a fairlead cable opening 15 between the roller extensions and the first end bracket 31, second end bracket 32. As described herein a combination fairlead may be used when a rope or cord extending through the fairlead cable opening is limited to contact to only three of the four surfaces, top, bottom, first end and second end.

As shown in FIG. 5 the bracket has a thickness 34 and the fairlead has a thickness 14, which is reduced as the first and second roller set down into the roller extension grooves 44 of the first and second roller extensions, respectively. The roller extension grooves 44 may have a depth 45 into the bracket 30 that is a dimension or a percentage of the bracket thickness 34, as described herein. This compact design is beneficial as it requires less space.

Figure 6:
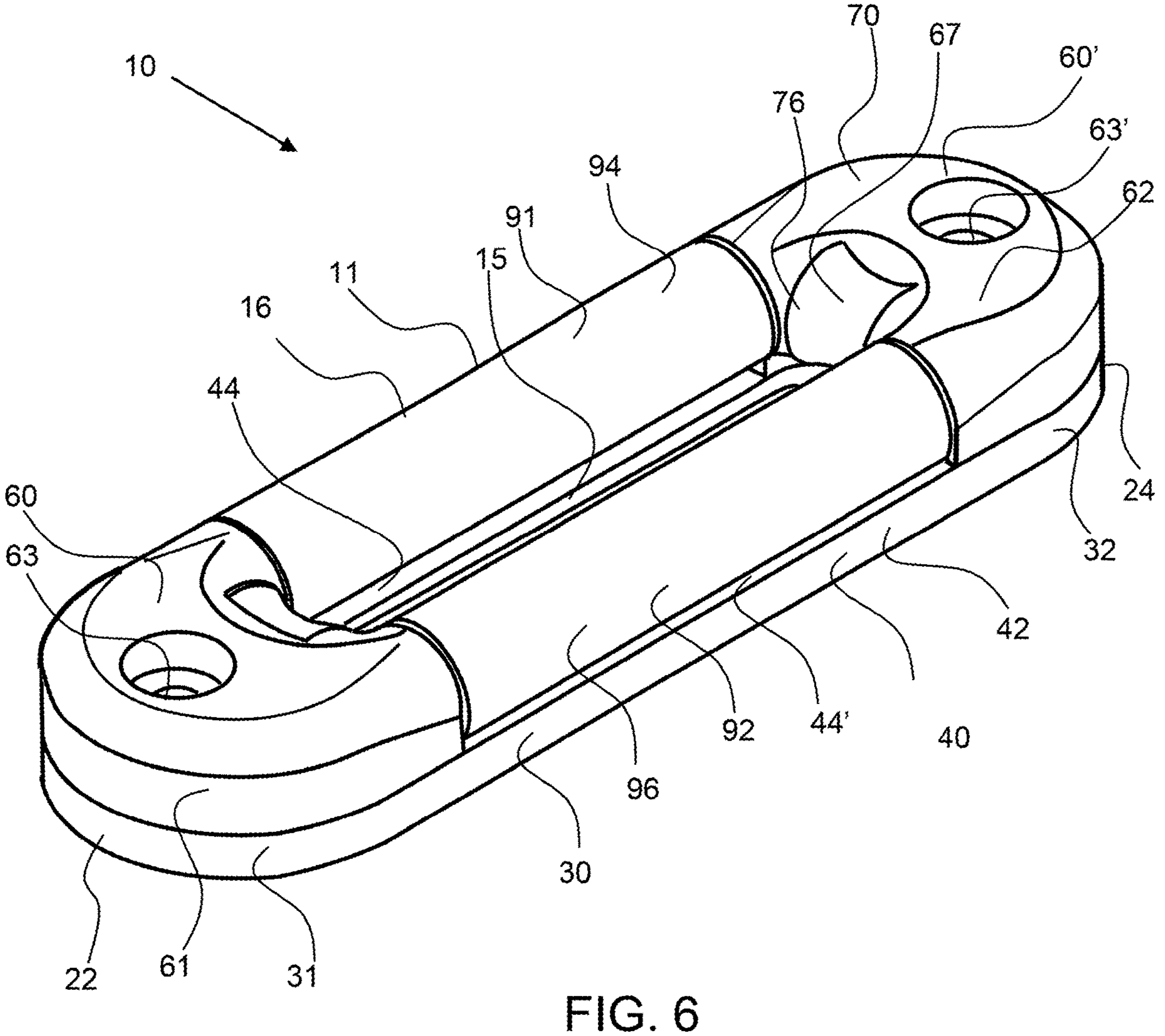
FIG. 6 shows a perspective view of a roller fairlead having a first end-roller assembly on the first end and a second end-roller assembly on the second end and with a first roller and a second roller extending between the end-roller assemblies.

As shown in FIG. 6, a roller fairlead 16 has a first end-roller assembly 61 on the first end 22, a second end-roller assembly 62 on the second end 24, and a first roller assembly 91 on a first side and a second roller assembly 92 on the second side and extending between the end-roller assemblies. All four interior surfaces of the fairlead cable opening 15 are configured with a roller and a rolling surface. The end-rollers 76 are concave end-rollers having a concave profile to enable smooth transition from the first and second rollers into the end-roller, or first and second rollers.

Figure 7:
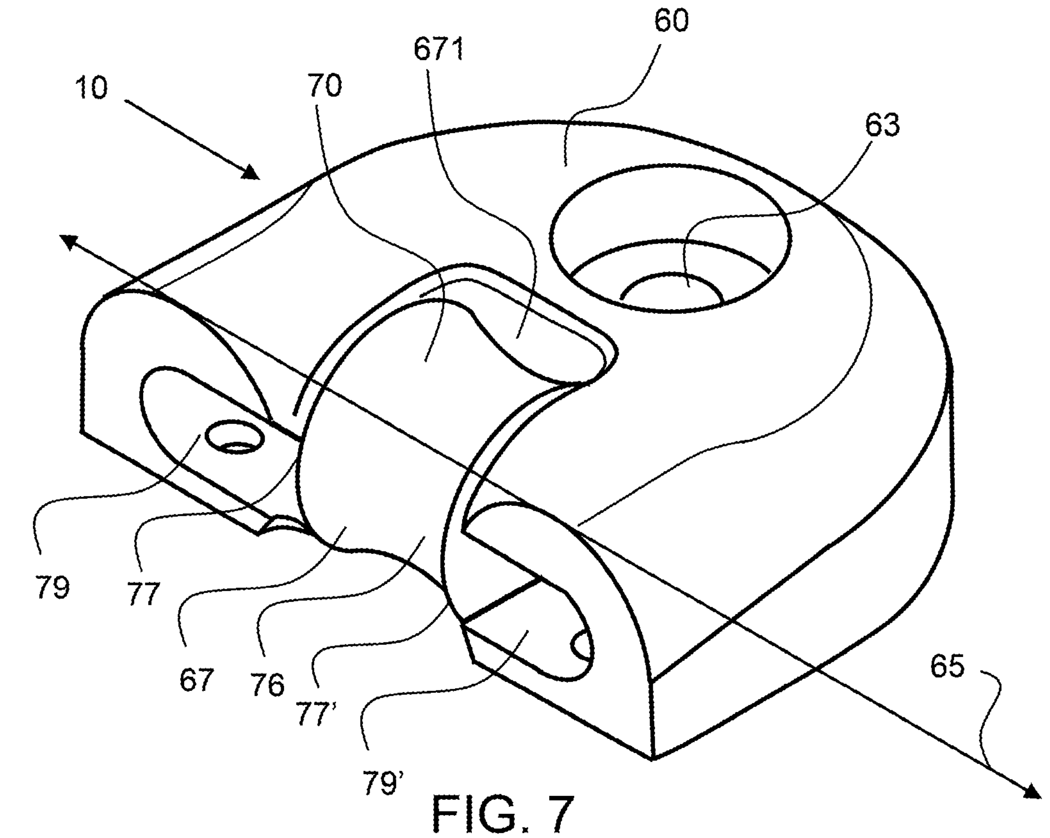
FIG. 7 shows a perspective view of an exemplary end-roller assembly that is configured to detachably attach to the bracket and is symmetric to allow attachment to either the first end bracket or the second end bracket of the bracket.
Figure 8:
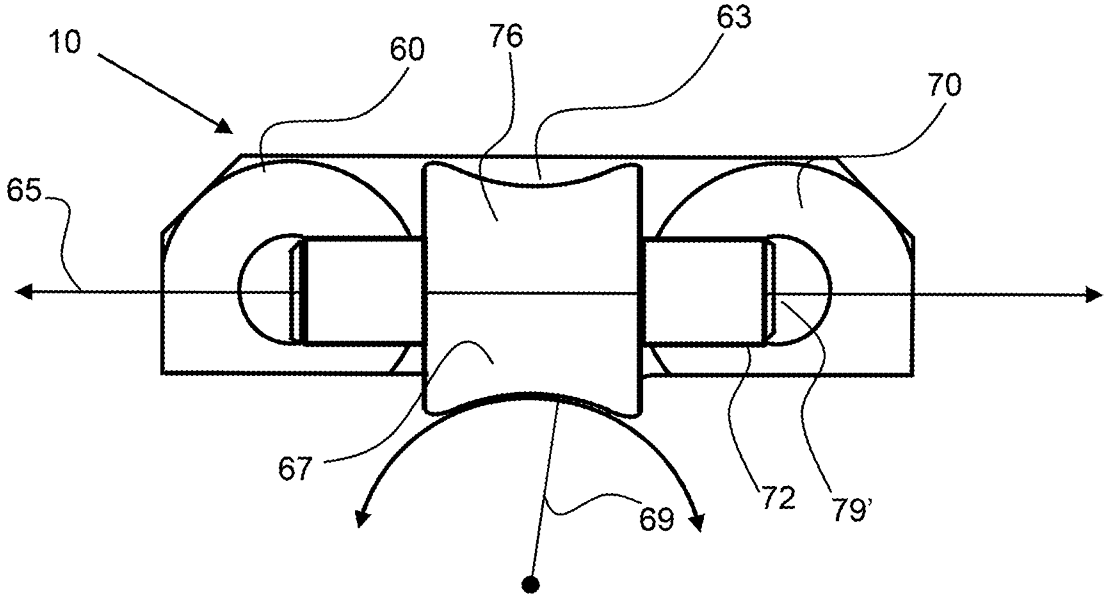
FIG. 8 shows an inside end view of the end-roller assembly shown in FIG. 7 having a concave end-roller with a radius of curvature and secured in the end-roller assembly by said end-roller axle.
Figure 9:
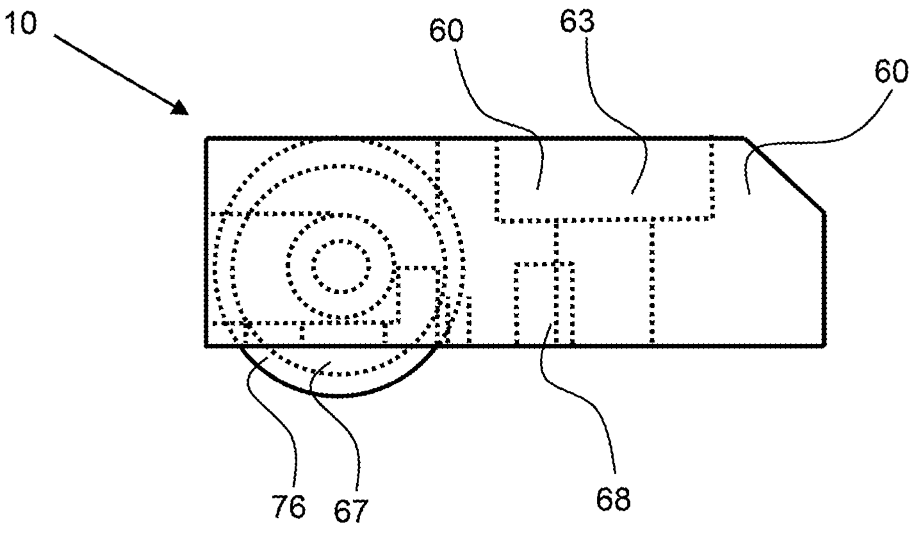
FIG. 9 shows a side view of the end-roller assembly shown in FIGS. 7 and 8 having a mounting aperture therethrough for coupling the fairlead to structure, such as a vehicle, and an attachment aperture for receiving a fastener to detachably attach the end-roller assembly to the bracket.
Figure 10:
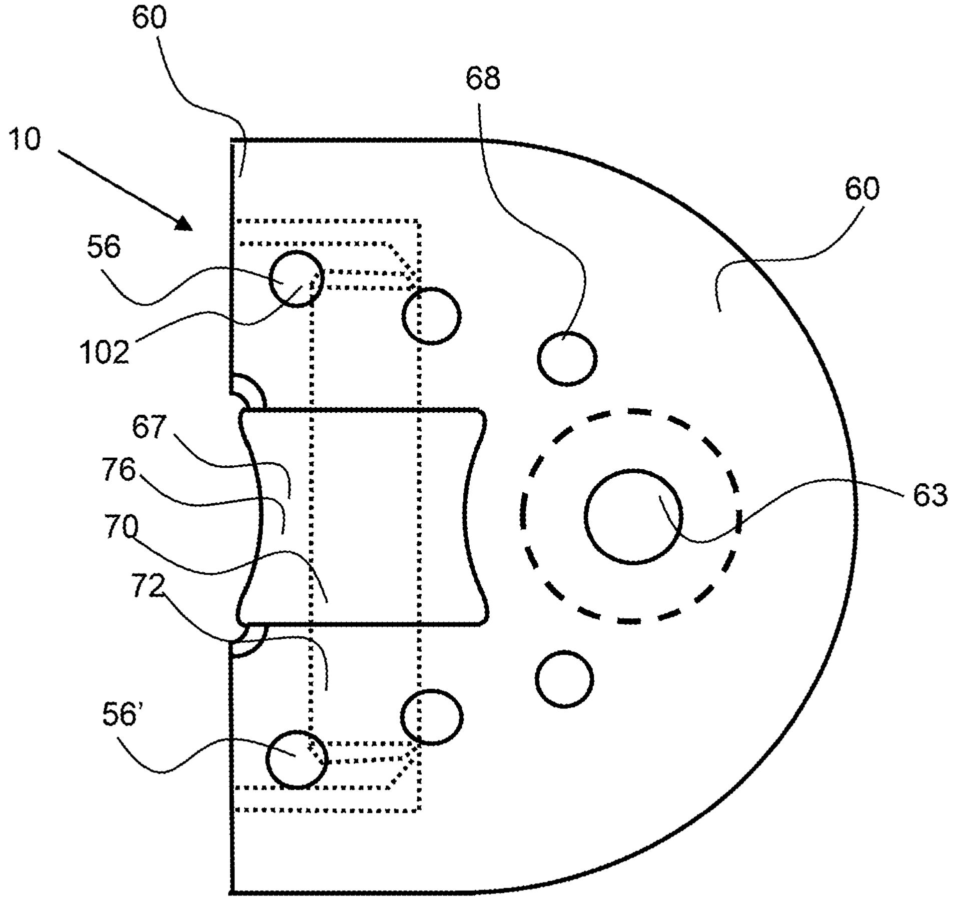
FIG. 10 shows a back view of the end-roller assembly shown in FIGS. 7 to 9, having a mounting aperture therethrough for coupling the fairlead to structure, such as a vehicle, an attachment aperture for receiving a fastener to detachably attach the end-roller assembly to the bracket, and a pair of retaining pin apertures configure to retain roller assemblies within the end-roller assembly.
Figure 11:
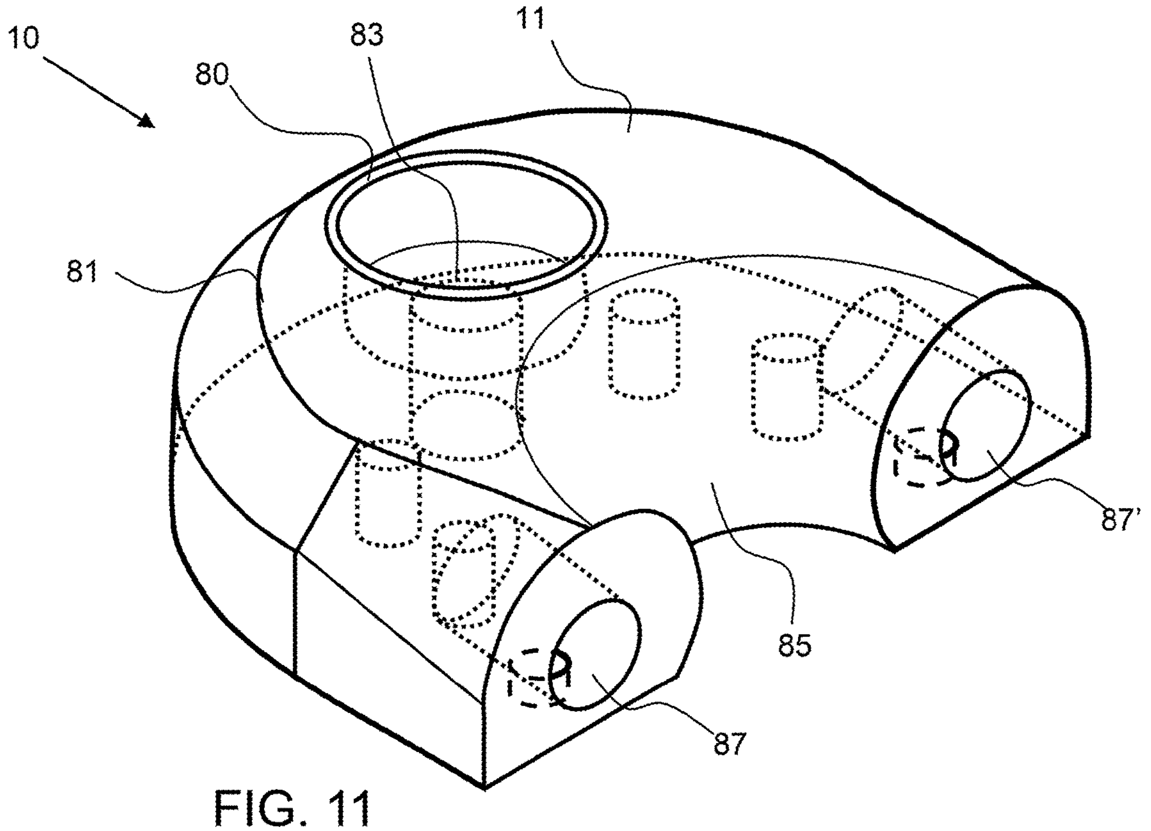
FIG. 11 shows a perspective view of an exemplary hawse fixture that is configured to detachably attach to the bracket and is symmetric to allow attachment to either the first end bracket or the second end bracket of the bracket.
Figure 12:
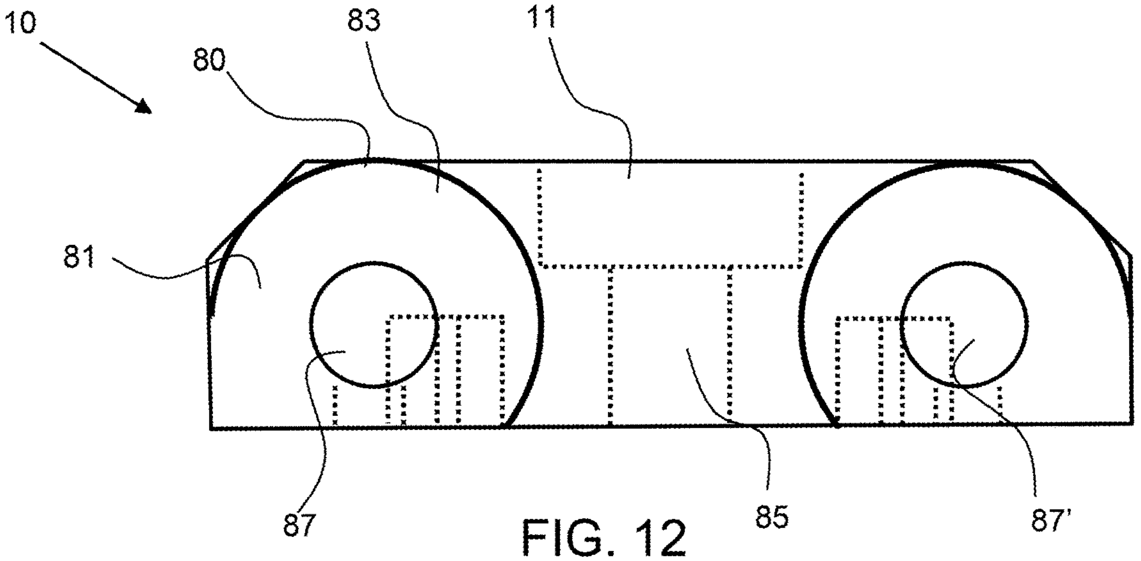
FIG. 12 shows an inside end view of the hawse fixture shown in FIG. 11 having a curved rope surface for guiding a cable or rope and roller axel apertures for receiving the axles of the roller assemblies therein.

Referring now to FIGS. 7 to 10, an exemplary end-roller fixture 60 is configured to detachably attach to the bracket and is symmetric to allow attachment to either the first end bracket or the second end bracket of the bracket. The end-roller assembly therefore could be the first end-roller assembly or the second end-roller assembly or configured on the first end bracket or second end bracket, of the bracket. The end-roller fixture 60 has end-roller apertures 79, 79' that are configured to receive the end-roller axle 72. The end-roller 76 is configured in an end-roller slot in the end-roller fixture. The end-roller axis of rotation 65 is shown in FIGS. 7 and 8. The end-roller 76 is a concave end-roller 67 configured in the slot of the end-roller fixture 60 having a radius of curvature 69 as shown in FIG. 8. As shown in FIG. 10, a retaining pin apertures 56, 56' are configured to receive a retaining pin that interfaces with the end-roller axle 72, to retain and/or prevent the axle and end-roller 76 configured thereover from being pulled out from the end-roller assembly or end-roller slot. As shown in FIG. 7 the ends 77, 77' of the end-roller 76 configured to be tangent, within about 15 degrees or less, about 10 degrees or less, or about 5 degrees or less, with the outside surface of the of the first roller and second roller.

Figure 20:
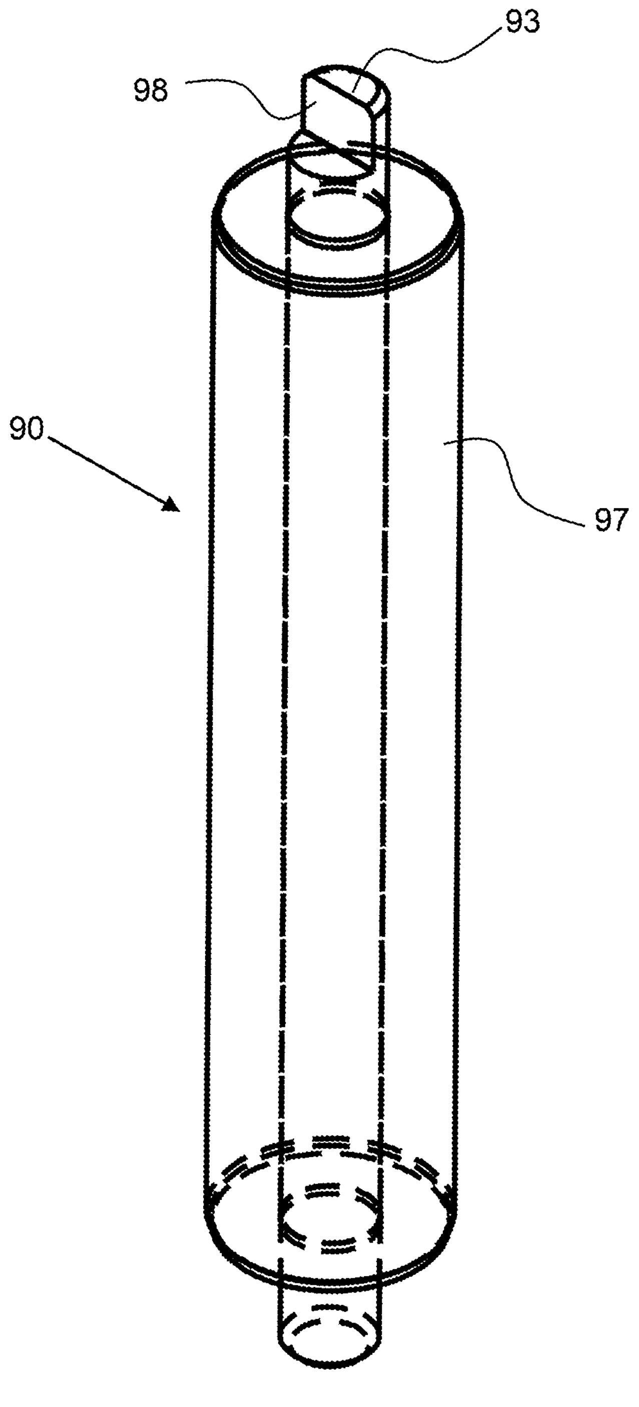
FIG. 20 shows a perspective view of an extension roller assembly having a first roller and an axle extending therethrough and an axle pin retainer, a groove in the axle configured to prevent the axle from spinning.
Figure 21:
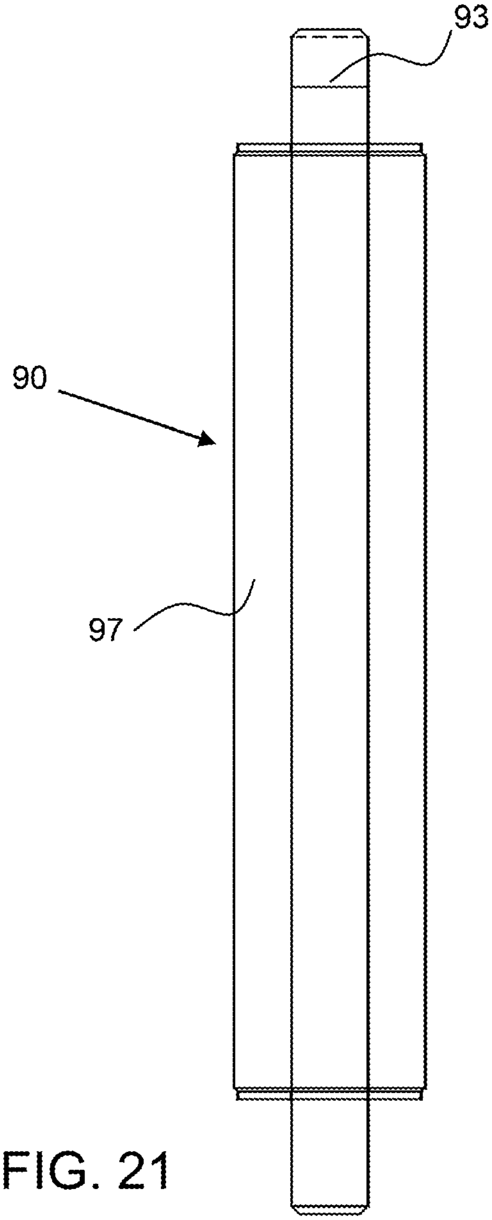
FIG. 21 shows a front view of a roller assembly having a first roller and an axle extending therethrough.
Figure 22:
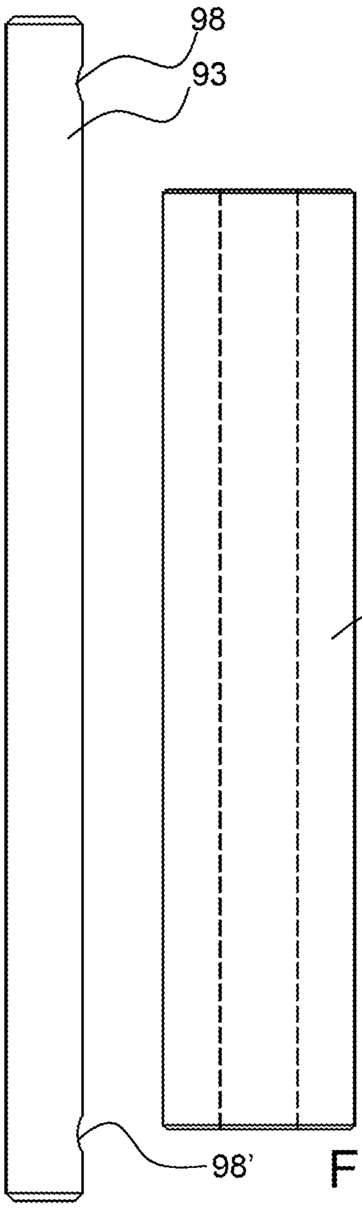
FIG. 22 shows a front view of the first roller and the axle removed from the first roller.

The exemplary end-roller fixture 60 has roller axle apertures 79, 79' configured to receive the axle 93 of the extension roller assembly 90, as shown in FIG. 20. The roller 97 is configured around the roller axle.

The exemplary end-roller fixture 60 is a monolithic component being made from a single piece of material, such as by being formed from a single piece of material in a mold or by machining a single piece of material. The retainer pin 102 is configured in the retainer pin aperture 56 and may be hardened steel shear pins. As shown in FIG. 10, the end-roller fixture 60 has a mounting aperture 63 for receiving a fastener to secure the fairlead to an object, a plurality of attachment apertures 68 are configured to receive a fastener for detachably attaching the end-roller fixture 60 to the bracket, not shown. An end-roller fixture 60 may be detachably attached to a first end, second end or both ends of a fairlead.

Referring now to FIGS. 11 to 15, an exemplary hawse fixture 80 is configured to detachably attach to the bracket and is symmetric to allow attachment to either the first end bracket or the second end bracket of the bracket of the convertible fairlead assembly system 10. A hawse fixture 80 may be detachably attached to a first end, second end or both ends of a fairlead. The exemplary hawse fixture is a monolithic component being made from a single piece of material, such as by being formed from a single piece of material by casting or by machining a single piece of material. The exemplary hawse fixture 80 has roller axle apertures 87, 87' configured to receive the axle 93 of the extension roller assembly 90, as shown in FIG. 20. The roller 97 is configured around the roller axle.

Figure 13:
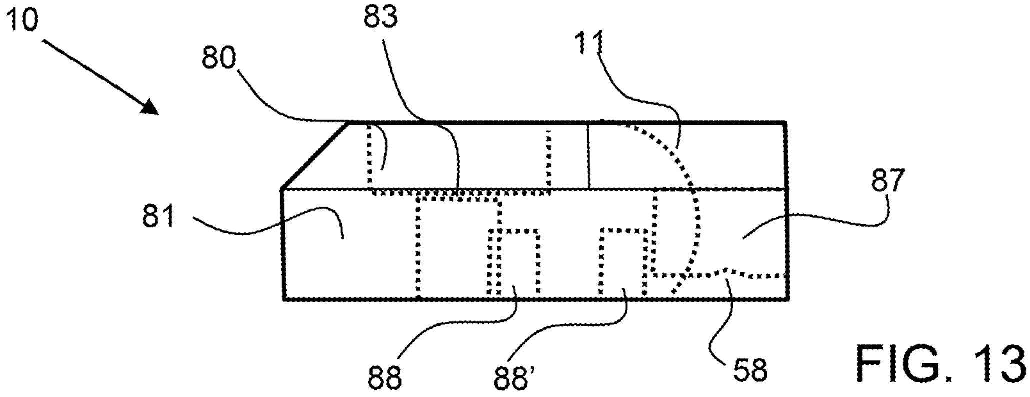
FIG. 13 shows a side view of the hawse fixture shown in FIGS. 11 and 12 having a mounting aperture therethrough for coupling the fairlead to structure, such as a vehicle, an attachment aperture for receiving a fastener to detachably attach the hawse fixture to the bracket, a roller axle aperture for receiving the axle of the roller assembly and a retaining pin aperture that is configured to receive a retaining pin that extends into an axle pin aperture in the roller axle.

As shown in FIG. 13, the hawse fixture 80, has a retaining pin aperture 58 configured to receive a retaining pin therein that interfaces with the axle of the roller assembly. Also, the attachment apertures 88, 88' extend up from a back side of the hawse fixture and may be threaded to allow a fastener, such as a bolt to pull the hawse fixture down onto the bracket. These attachment apertures may align with apertures in the bracket to allow a fastener to be inserted through the bracket and into the back side od the hawse fixture 80.

Figure 14:
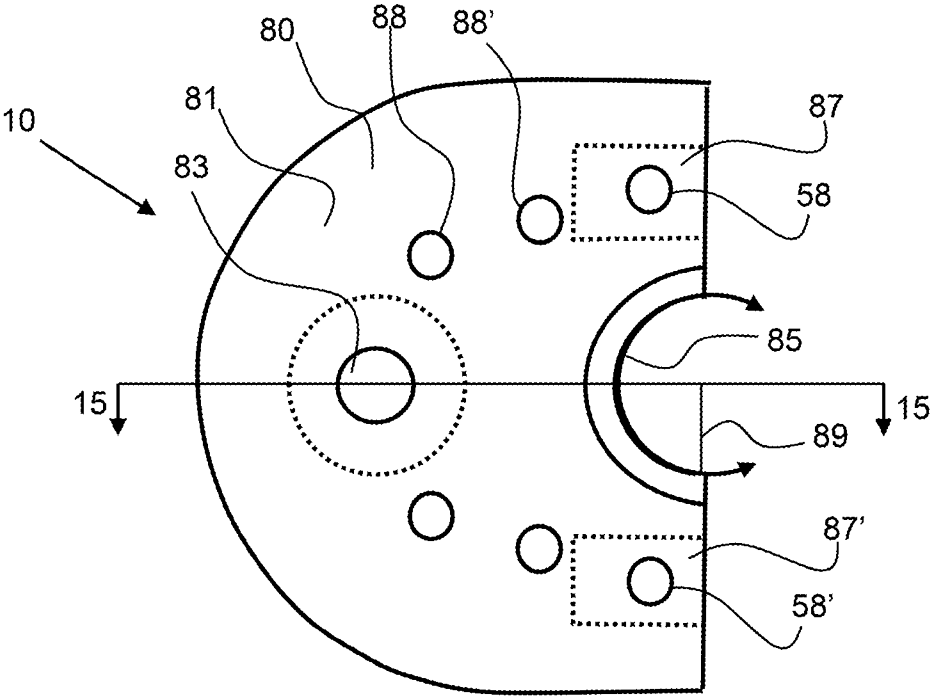
FIG. 14 shows a back view of the hawse fixture shown in FIGS. 11-13, having a mounting aperture therethrough for coupling the fairlead to structure, such as a vehicle, an attachment aperture for receiving a fastener to detachably attach the hawse fixture to the bracket, and a pair of retaining pin apertures configure to retain roller assemblies within the hawse fixture.

As shown in FIG. 14, the hawse fixture has a mounting aperture 83 therethrough for coupling the fairlead to a structure, such as a vehicle. The curved rope surface 85 has a radius of curvature 89. The ends of the rope contact surface are substantially tangent with the outer surfaces of the first or second (top and bottom) rollers, thereby making a smooth transition from the roller to the curved rope contact surface. Again, the retaining pin aperture 58 is aligned with the roller axle aperture 87 and configured to receive a retaining pin therein that interfaces with the axle of the roller assembly.

Figure 15:
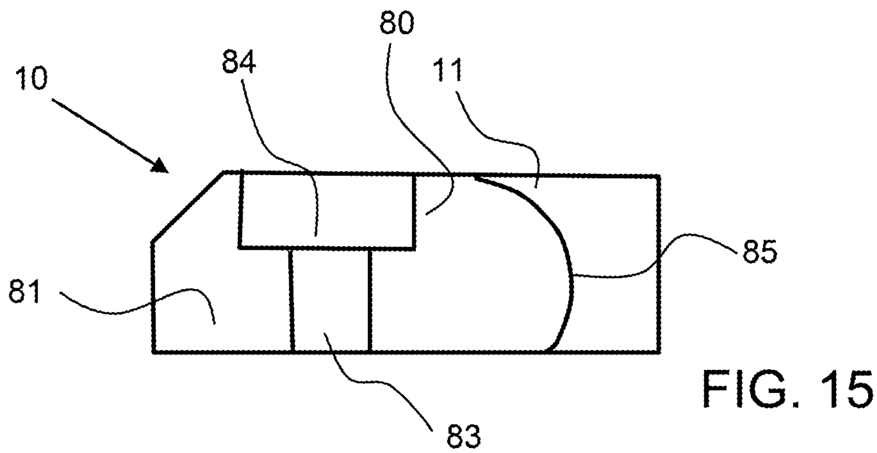
FIG. 15 shows a cross sectional view of the hawse fixture along line 15-15 of FIG. 14, and shows the mounting aperture and the FIG. 16 shows a perspective front view of the of the bracket having a first end bracket and a second end bracket and a first and second roller extension extending between said end brackets for receiving the first and second extension rollers.

FIG. 15 shows a cross sectional view of the hawse fixture 80 along line 15-15 of FIG. 14, and shows the mounting aperture 83 extending through the hawse fixture. The mounting aperture has a recessed 85 for receiving a fastener head therein.

Figure 16:
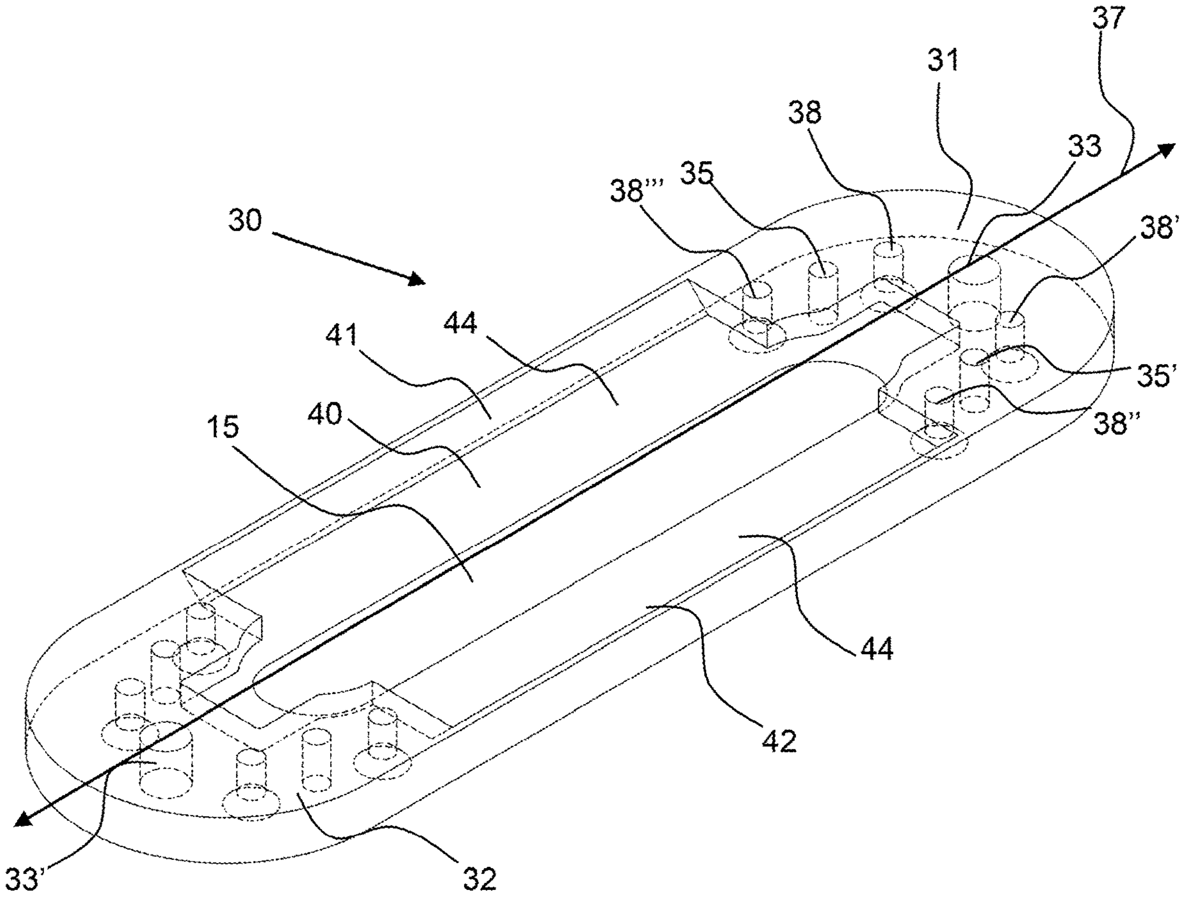
Figure 17:
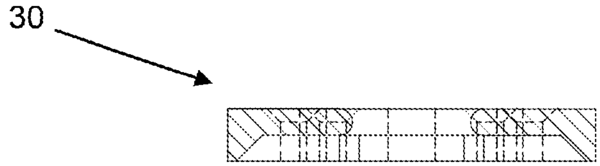
FIG. 17 shows cross-section view of the of the bracket shown in FIG. 18 along line 17-17.
Figure 18:
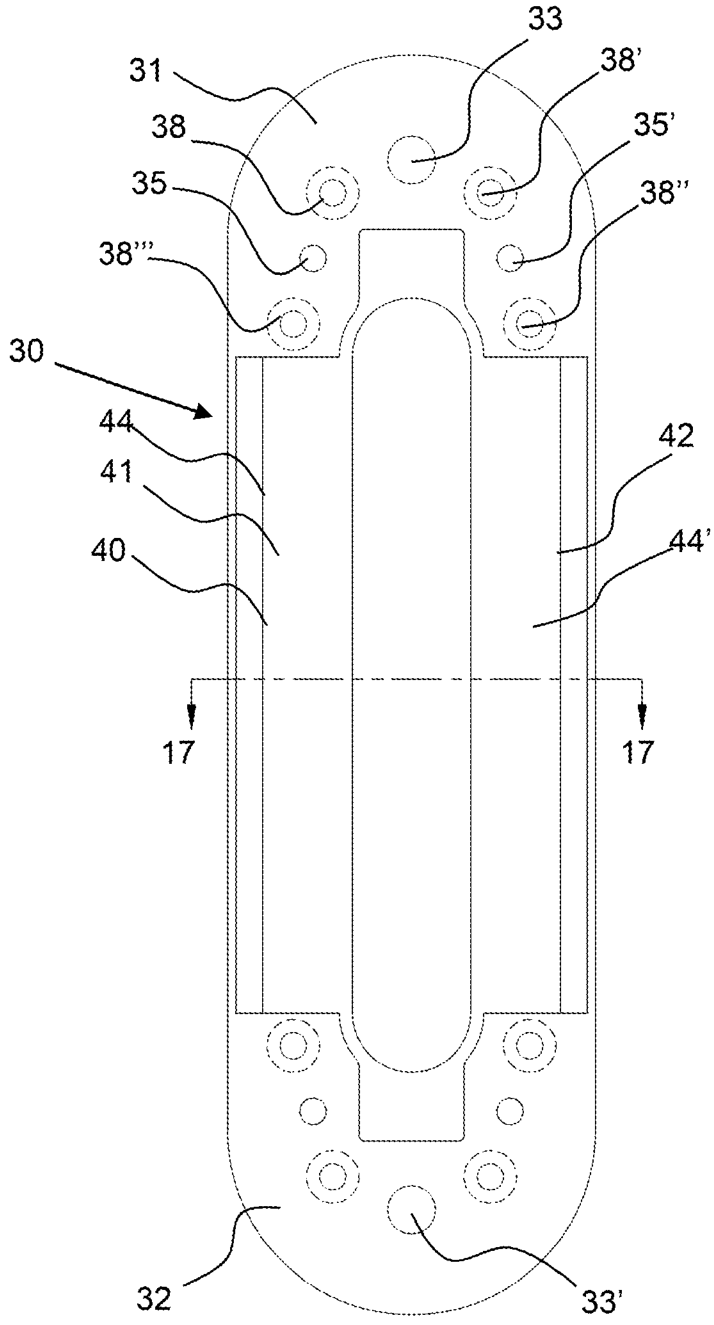
FIG. 18 shows a front view of the end bracket shown in FIG. 16.
Figure 19:
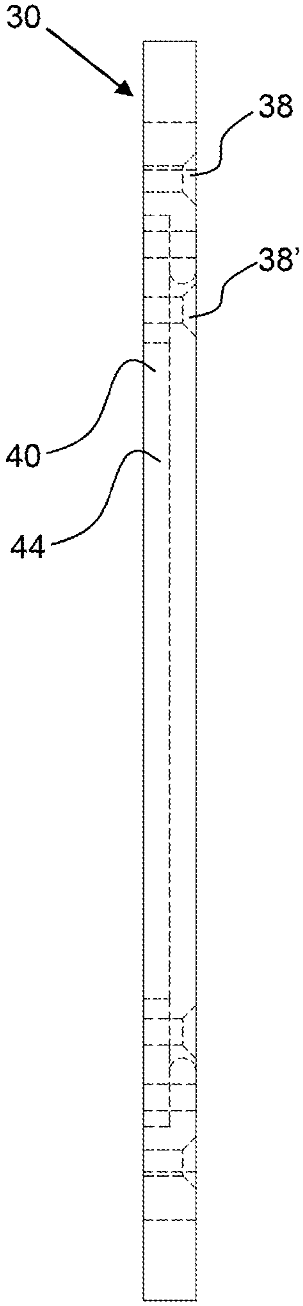
FIG. 19 shows a side view of the end bracket shown in FIG. 16.

Referring now to FIGS. 16 to 19, an exemplary bracket 30 has a first end bracket 31, a second end bracket 32, a first roller extension 41 and a second roller extension 42 extending between said end brackets. The bracket may be a monolithic component being made from a single piece of material, such as by being formed from a single piece of material by casting or by machining. The first and second roller extensions have a roller extension groove 44, 44' that allows the roller to set down into the roller extension and thereby produce a lower profile. As shown in FIG. 16, the bracket has a plurality of attachment apertures 38, 38' 38'', 38''' on the first end bracket and also on the second end bracket. The apertures are symmetric with respect a centerline 37 of the bracket to enable the hawse or end-roller fixtures to be interchanged from side to side. Also, the bracket pin apertures 35, 35' are symmetric about the centerline and are configured to receive a retainer pin to retain a roller axle of an end-roller fixture. As shown in FIG. 19, the attachment apertures are countersunk, or taper from the surface down into the bracket, to allow a fastener head to be countersunk therein.

Figure 23:
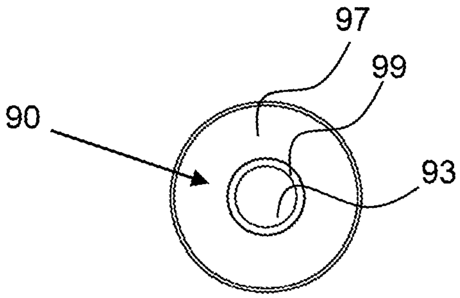
FIG. 23 shows an end view of the roller assembly.
Figure 24:
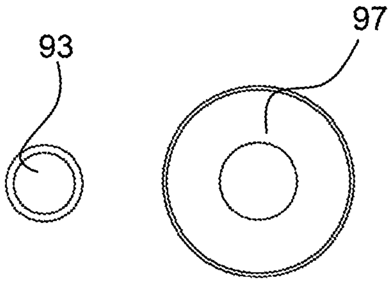
FIG. 24 shows an end view of the first roller and the axle removed from the first roller.

Referring now to FIGS. 20, to 24, an extension roller assembly 90, which may be the first or second extension roller assembly has a roller 97 and a roller axle 93 extending therethrough and an axle pin retainer 98, such as a flat surface, groove or aperture in the axle configured to interface with or receive the pin and prevent the axle from spinning. As shown in FIG. 23, a roller bearing 99 may be configured between the roller and the roller axle. The axle pin retainer and pin arrangement with axle pin retainer 98 may create a log cabin or mortise lock on the axle. This type of arrangement not only prevents the axle from spinning but provides structural integrity and also allows the opposing axles to be configured in a compact design.

Figure 25:
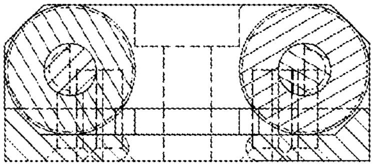
FIG. 25 shows a cross-sectional view along lines 25-25 of FIG. 26 of a hawse-roller fairlead.
Figure 26:
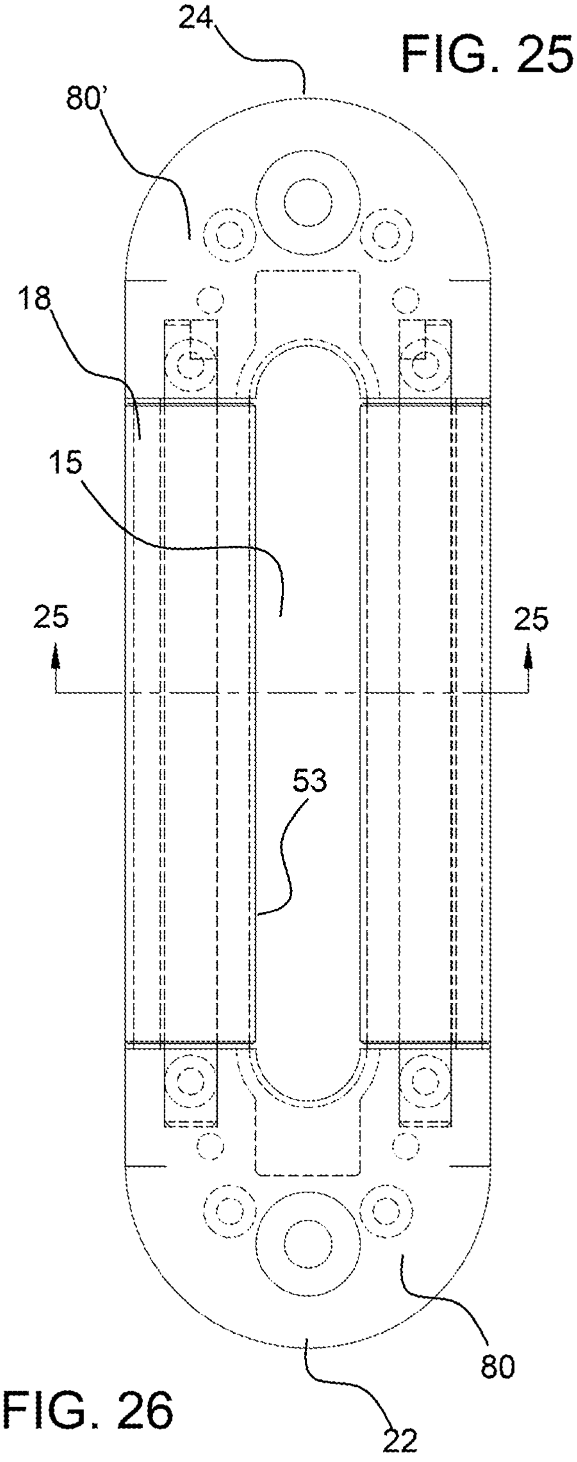
FIG. 26 shows a front view of a hawse-roller fairlead.
Figure 27:
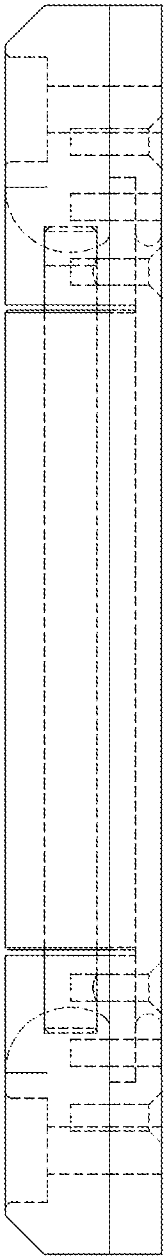
FIG. 27 shows a side view of the hawse-roller fairlead shown in FIG. 26.
Figure 29:
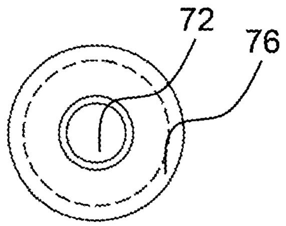
FIG. 29 shows an end view of the concave end-roller and axle shown in FIG. 28.
Figure 30:
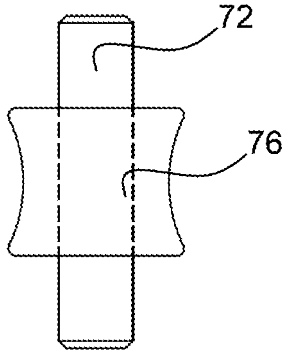
FIG. 30 shows a front view of the concave end-roller and axle shown in FIG. 28.
Figure 28:
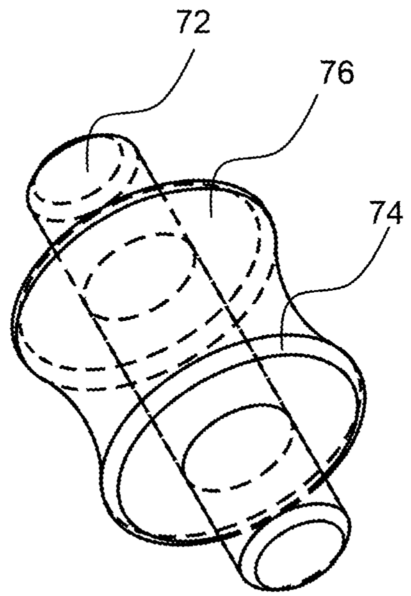
FIG. 28 shows a perspective view of a concave end-roller with the end-roller axle extending therethrough.
Figure 31:
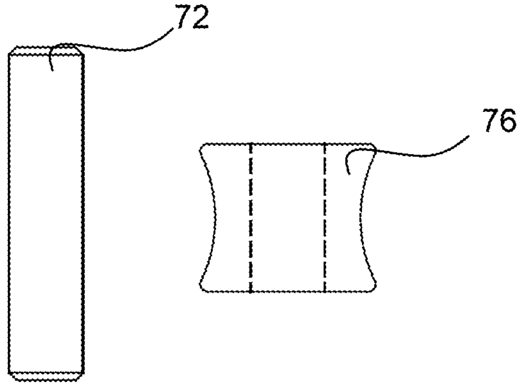
FIG. 31 shows the concave end-roller and end-roller axle separated.
Figure 32:
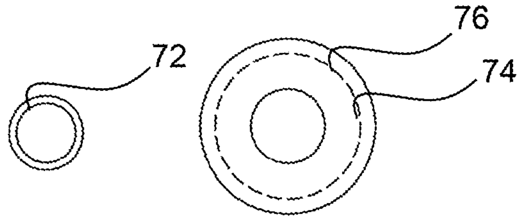
FIG. 32 shows an end view of the concave end-roller and separated end-roller axle as shown in FIG. 31.

Referring now to FIGS. 25 to 27, an exemplary convertible fairlead assembly 10 provides a compact design having a substantially continuous fairlead cable perimeter 53 of the fairlead cable opening 15, having a gap distance in this fairlead cable perimeter between roller surfaces and the hawse fixture or end-roller of no more than 5 mm and preferably not more than 3 mm. The exemplary convertible fairlead assembly 10 has hawse fixture 80, 80' configured on both the first end and second end of the fairlead.

Referring now to FIGS. 29 to 32, an exemplary end-roller 76 is configured around an end-roller axle 72. End-roller bearing 74 enable low friction rolling of the end-roller on the end-roller axle 72. The end-roller is a concave end-roller 78, having a concave surface to guide a cable or rope.

Where there are discrepancies between this application and 63/274,173, filed on Nov. 1, 2022, this application shall dominate.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A convertible roller-hawse fairlead assembly system comprising:
- a) a first roller;
- b) a second roller;
- c) a first end-roller assembly comprising:
  - i) a first end-roller fixture;
  - ii) a first end-roller axle;
  - iii) a first end-roller coupled to the first end-roller fixture and configured to spin about said end-roller axle;
- d) a first hawse fixture having a curved rope surface;
- e) a baseplate extending from a first end to a second end and having,
  - i) a thickness from a back side to a front side;
  - ii) a first end bracket;
  - iii) a second end bracket;
  - iv) a first roller extension extending from the first end bracket to the second end bracket;
  - v) a second roller extension extending from the first end bracket to the second end bracket;
  - vi) a fairlead cable opening having a perimeter;
  - wherein each of the first roller extension and second roller extension have a groove that is configured to receive said first roller and said second roller respectively;
  - wherein the first end-roller assembly is configured for detachable attachment to the first end bracket or second end bracket of the baseplate;

wherein the first hawse fixture is configured for detachable attachment to the first end bracket or second end bracket of the baseplate;

wherein the first end of the baseplate has one of said first end-roller assembly or first hawse fixture;

wherein the second end of the baseplate has one of said first end-roller assembly or first hawse fixture; and wherein the convertible roller-hawse fairlead assembly is convertible from a roller fairlead having said first end-roller assembly detachably attached to the first end bracket of the baseplate and a second end-roller assembly detachably attached to the second end bracket of the baseplate, to a hawse-roller fairlead having a first hawse fixture detachably attachable to the first end bracket of the baseplate and a second hawse fixture detachably attachable to the second end bracket of the baseplate, to a combination fairlead having one of each of the first end-roller assembly and the first hawse fixture detachably attached to opposing said first end bracket and said second end bracket of the baseplate.

2. The convertible roller-hawse fairlead assembly system of claim 1, wherein the baseplate has a plurality of attachment apertures that are symmetric from said first end bracket to said second end bracket, and wherein each of the first end-roller fixture and the first hawse fixture have attachment apertures that are aligned with the attachment apertures in the bracket to enable the first end-roller fixture and the first hawse fixture to be interchanged from said first end bracket to said second end bracket.

3. The convertible roller-hawse fairlead assembly system of claim 1, wherein the groove of the first roller extension and the second roller extension has a radius of curvature that is at least the respective radius of the first roller and the second roller.

4. The convertible roller-hawse fairlead assembly system of claim 3, wherein roller extension groove has a depth that is at least 5% of the diameter of the first or second rollers.

5. The convertible roller-hawse fairlead assembly system of claim 1, wherein the first end-roller is a concave end-roller having a concave surface extending from a first end to a second end.

6. The convertible roller-hawse fairlead assembly system of claim 5, wherein the first end and second end of the end-roller are substantially tangent, within 15 degrees, with the outside surface of the first roller and second roller.

7. The convertible roller-hawse fairlead assembly system of claim 6, wherein the fairlead cable opening is substantially continuous having a transition from the end-roller to an outside surface of the first roller or second roller surface is 5 mm or less.

8. The convertible roller-hawse fairlead assembly system of claim 1, wherein the curved rope surface of the first hawse fixture extend substantially tangent, within 15 degrees, with the outside surface of the first roller and second.

9. The convertible roller-hawse fairlead assembly system of claim 1, wherein the convertible roller-hawse fairlead assembly is configured as a hawse-roller fairlead having said first hawse fixture detachably attachable to the first end bracket of the baseplate and a second hawse fixture detachably attachable to the second end bracket of the baseplate, wherein the perimeter of the fairlead cable opening is substantially continuous with ends of each of the curved rope surfaces of the first and second hawse fixtures extending substantially tangent, within 15 degrees, with the outside surface of the first and second rollers and having a transition gap to the outside surface of the first roller and second roller surface that is 5 mm or less.

10. The convertible roller-hawse fairlead assembly system of claim 1, wherein the convertible roller-hawse fairlead assembly is configured as a roller fairlead having said first end-roller assembly detachably attached to the first end bracket of the baseplate and a second first end-roller assembly detachably attached to the second end bracket of the baseplate, wherein the perimeter of the fairlead cable opening is substantially continuous with the first end-roller and second end-roller having ends that are substantially tangent within 15 degrees of an outside surface of the first roller and second roller and having a transition gap to the outside surface of the first roller and second roller surface that is 5 mm or less.

11. A fairlead assembly comprising;

a) a first roller having a diameter, b) a second roller having a diameter;

c) a baseplate extending from a first end to a second end and having, i) a thickness from a back side to a front side;

ii) a first end bracket;

iii) a second end bracket;

iv) first roller extension extending from the first end bracket to the second end bracket;

v) a second roller extension extending from the first end bracket to the second end bracket;

d) a fairlead cable opening having a perimeter;

wherein each of the first roller extension and second roller extension have a roller extension groove configured to receive said first roller and said second roller respectively;

e) a first end-roller assembly comprising:

i) a first end-roller fixture;

ii) a first end-roller axle; and iii) a first end-roller coupled to the first end-roller fixture and configured to spin about said first end-roller axle;

wherein the groove reduces the thickness of the fairlead assembly, with a thickness of the fairlead assembly from the back side of the baseplate to an outermost outside surface of first roller being less than the sum of the baseplate thickness and the diameter of the first roller, by at least 3 mm; and wherein the baseplate has a plurality of attachment apertures in both the first end bracket and the second end bracket, wherein the plurality of attachment apertures are symmetric along a centerline from said first end bracket to said second end bracket, and wherein the first end-roller fixture has attachment apertures that are aligned with the attachment apertures in the first end bracket to enable the first end-roller fixture to be detachably attached to the first end bracket.

12. The fairlead assembly system of claim 11, wherein the groove of the first roller extension and the second roller extension is concave and has a radius of curvature that is at least the respective radius of the first roller and the second roller; and wherein the roller extension groove has a depth that is at least 5% of the diameter of the first or second rollers.

13. The fairlead assembly system of claim 11, wherein the first end-roller assembly is coupled to the first end bracket, and wherein ends of the first end-roller are substantially tangent within 15 degrees with an outside surface of the first roller and second roller.

14. The fairlead assembly system of claim 11, wherein the perimeter of the fairlead cable opening is substantially continuous with the first end-roller wherein the first end-roller has ends that are substantially tangent within 15 degrees of an outside surface of the first roller and second roller and a transition gap to the outside surface of the first roller and second roller surface that is 5 mm or less.

15. The fairlead assembly system of claim 14, wherein-when the fairlead assembly is configured as a roller fairlead comprising a second end-roller assembly detachably attached to the second end bracket and comprising:

i) a second end-roller fixture;

ii) a second end-roller axle; and iii) a second end-roller coupled to the second end-roller fixture and configured to spin about said second end-roller axle.

16. The fairlead assembly system of claim 11, wherein the fairlead assembly is configured as a combination fairlead comprising:

a) a first end-roller assembly detachably attached to the first end bracket and comprising:

i) a first end-roller fixture;

ii) a first end-roller axle; and iii) a first end-roller coupled to the first end-roller fixture and configured to spin about said first end-roller axle;

b) a second end hawse fixture detachable attached to the second end bracket and having a curved rope surface;

wherein the perimeter of the fairlead cable opening is substantially continuous with the curved rope surface of the second end hawse fixture being substantially tangent, within 15 degrees, with the outside surface of the first and second rollers, and with the first end and second end of the end-roller being substantially tangent, within 15 degrees, with the outside surface of the first roller and second roller.

17. The fairlead assembly system of claim 16, wherein a transition gap between the curved rope surface and the outside surfaces of the first roller and second roller that is 5 mm or less and wherein a transition gap between the first and second end of the end-roller and the outside surfaces of the first roller and second roller that is 5 mm or less.

* * * * *